July 20, 1954    H. C. SCHRYVER    2,683,924
MACHINE FOR ASSEMBLING NIPPLES ON CABLES
Filed Dec. 30, 1949    8 Sheets-Sheet 2
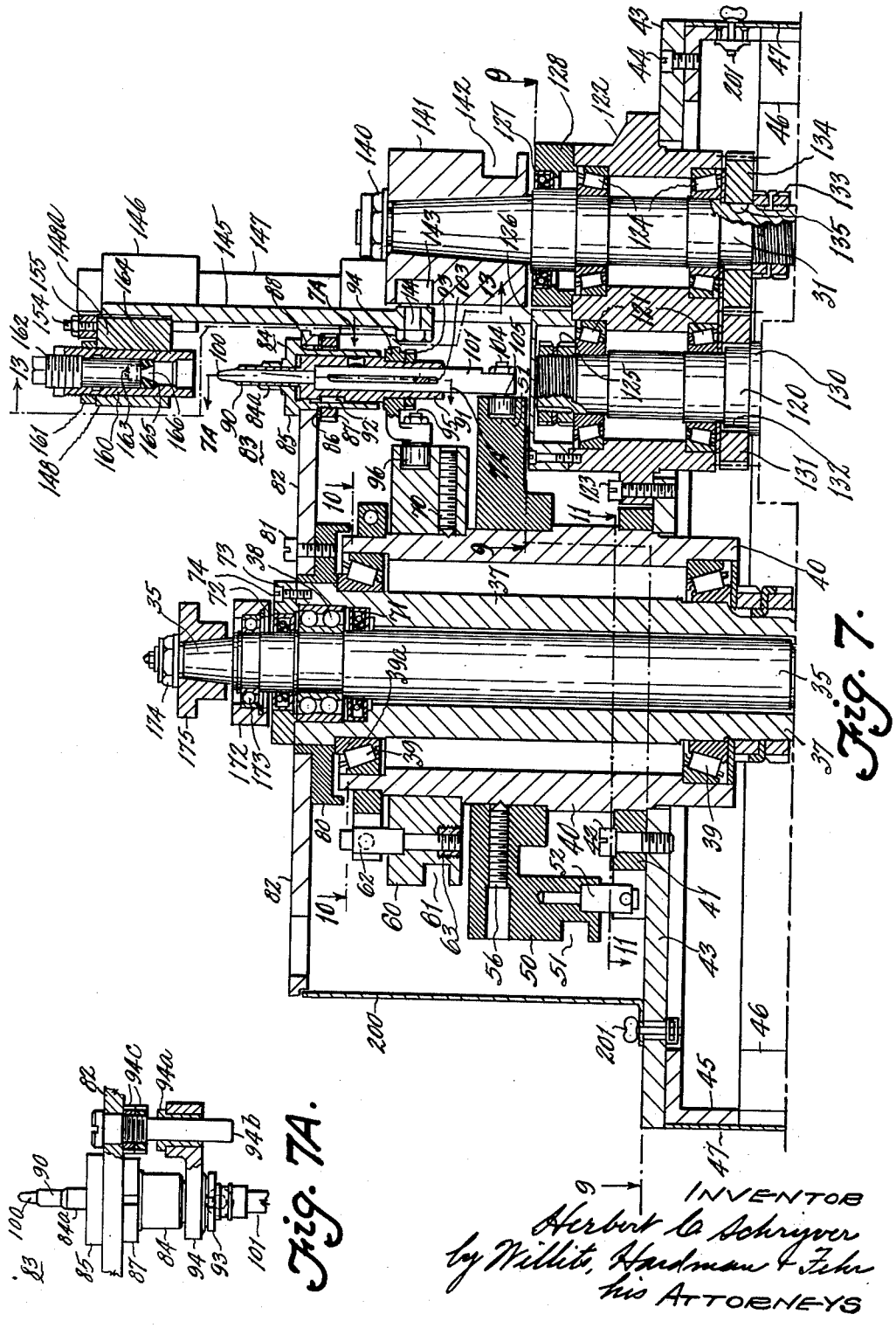

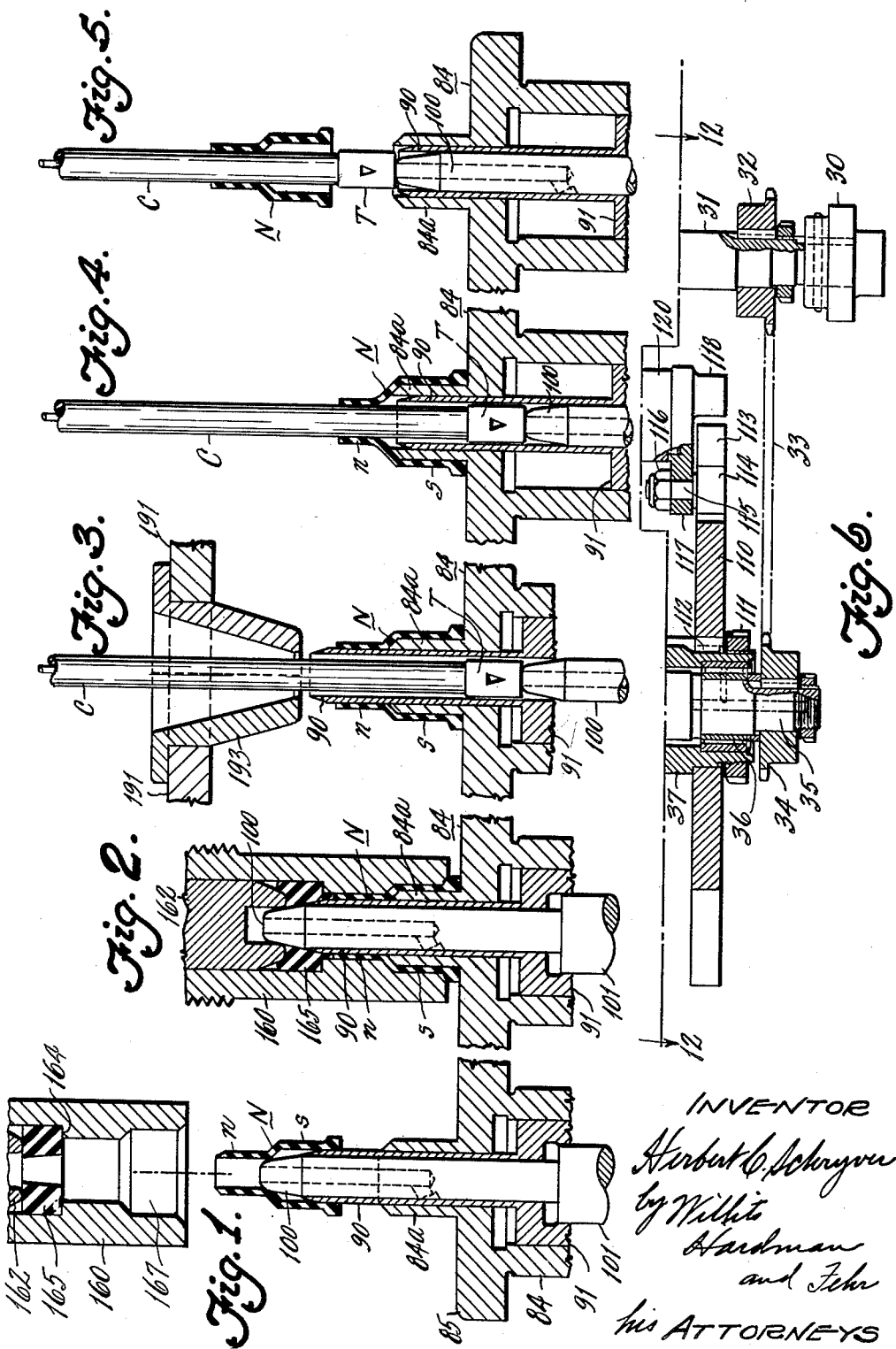

July 20, 1954 H. C. SCHRYVER 2,683,924
MACHINE FOR ASSEMBLING NIPPLES ON CABLES
Filed Dec. 30, 1949 8 Sheets-Sheet 3

INVENTOR
Herbert C. Schryver
by Willits Hardman & Fehr
his ATTORNEYS

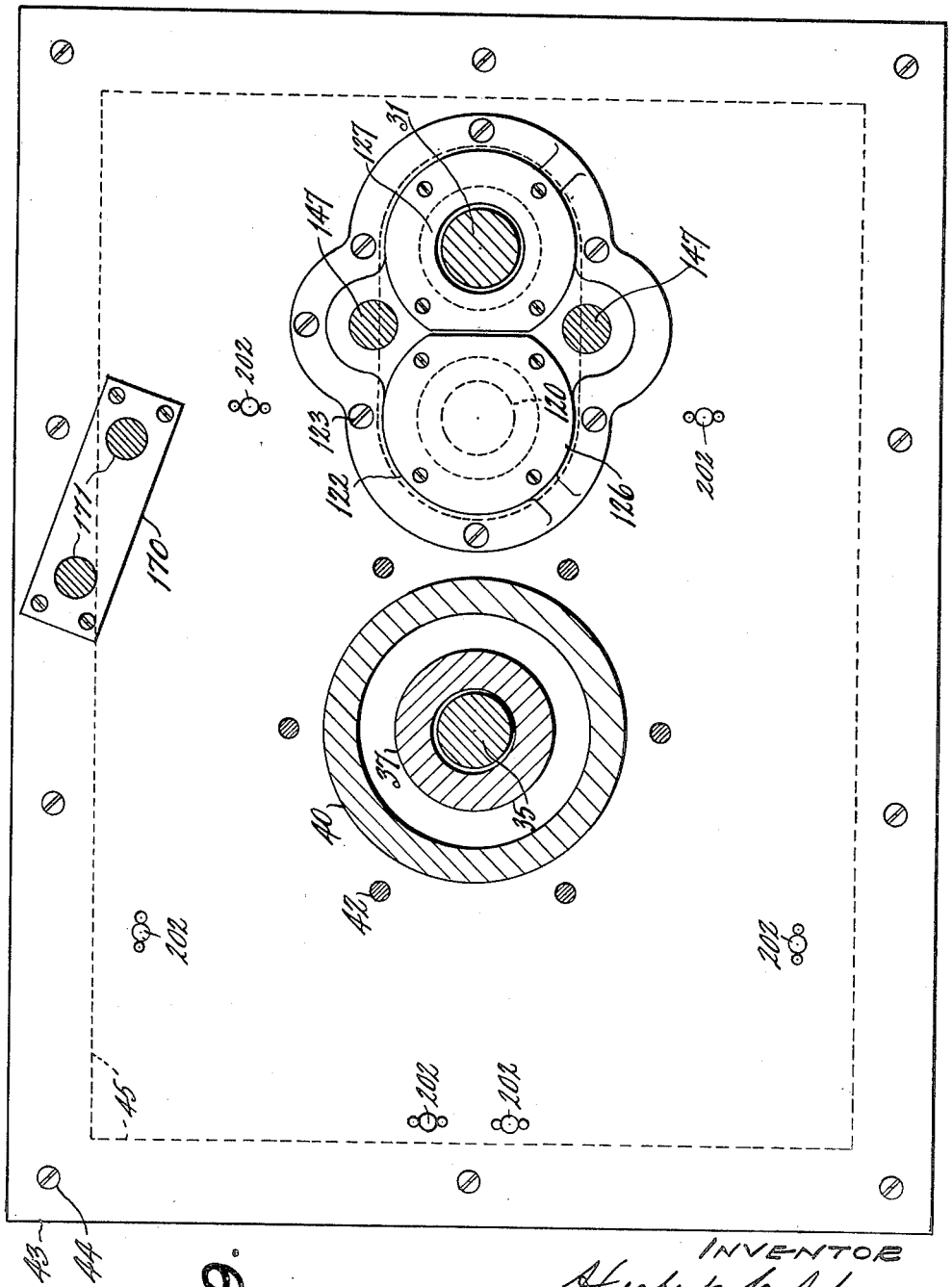

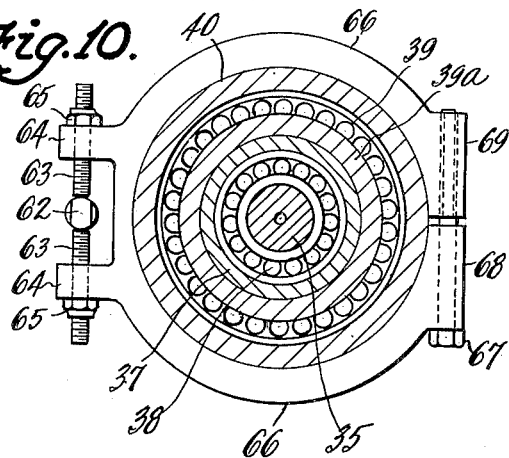
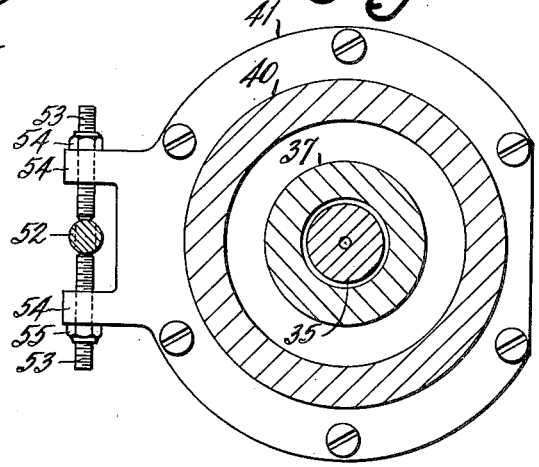
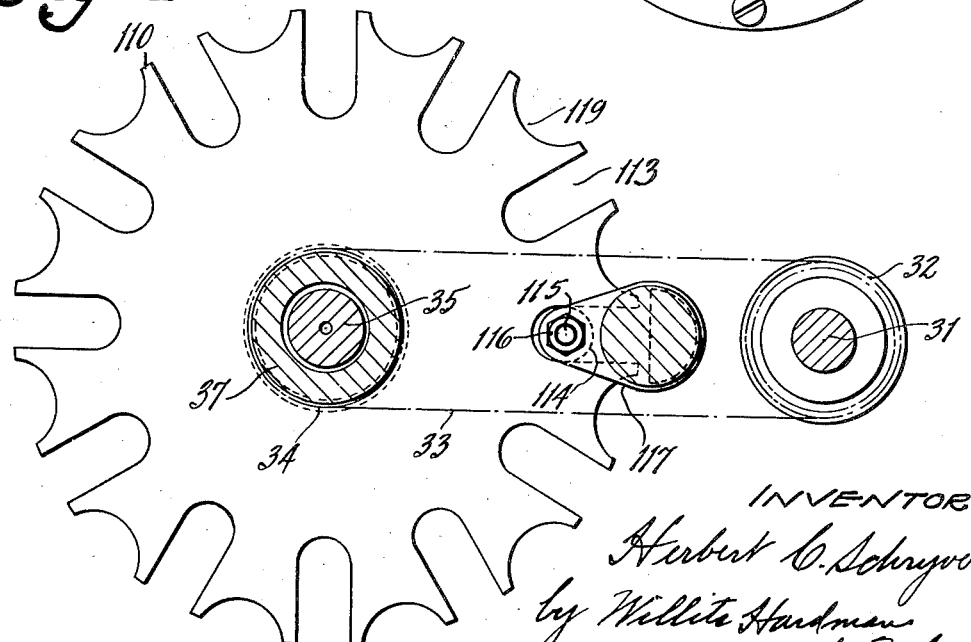

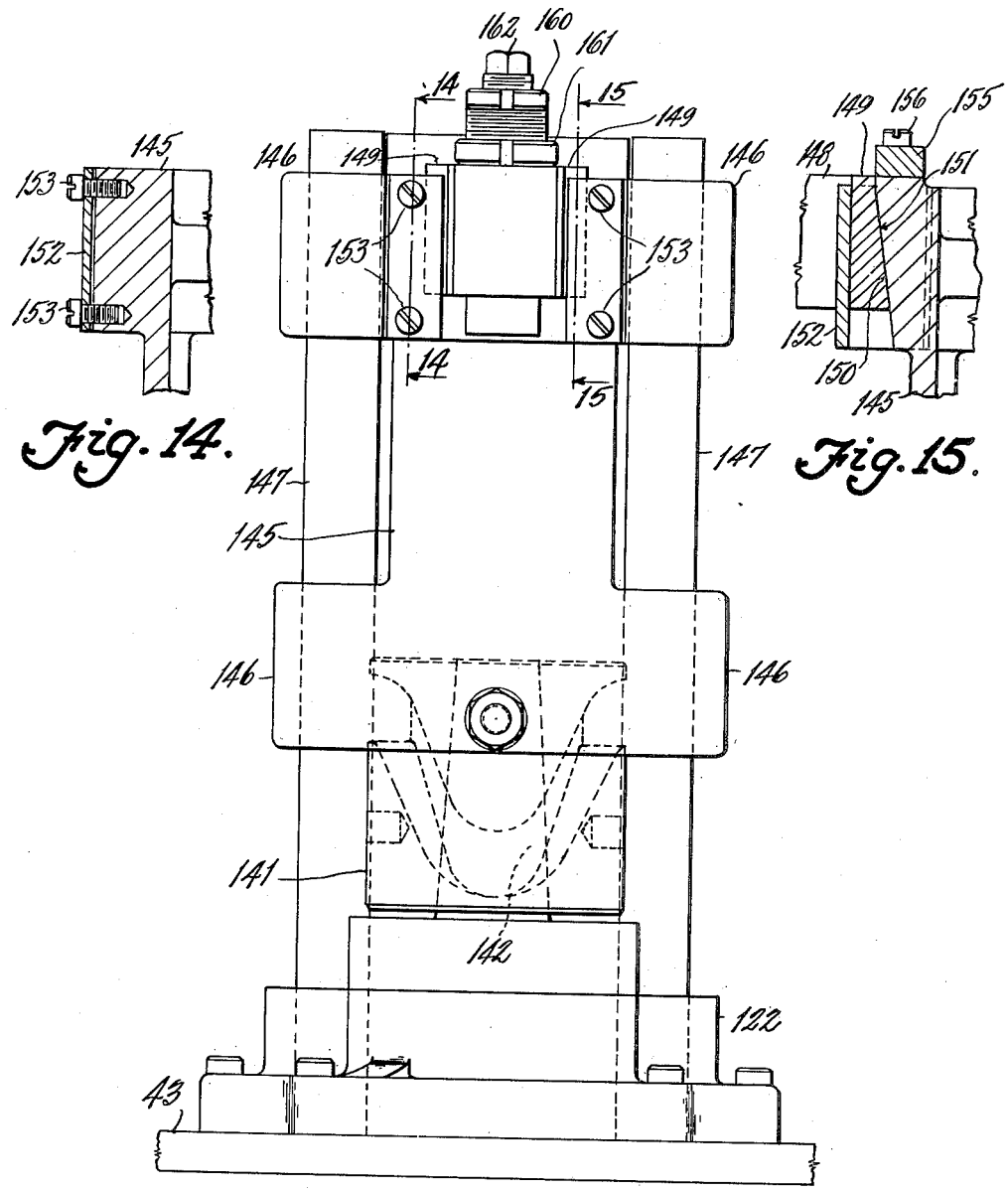

July 20, 1954 H. C. SCHRYVER 2,683,924
MACHINE FOR ASSEMBLING NIPPLES ON CABLES
Filed Dec. 30, 1949 8 Sheets-Sheet 7

INVENTOR
Herbert C. Schryver
by Willits Hardman & Fehr
his ATTORNEYS

July 20, 1954   H. C. SCHRYVER   2,683,924
MACHINE FOR ASSEMBLING NIPPLES ON CABLES
Filed Dec. 30, 1949   8 Sheets-Sheet 8
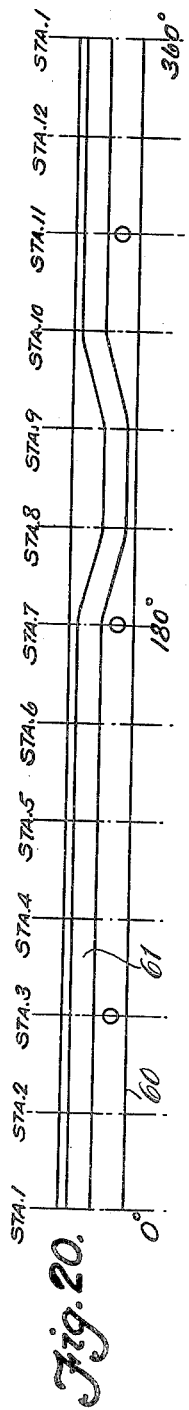
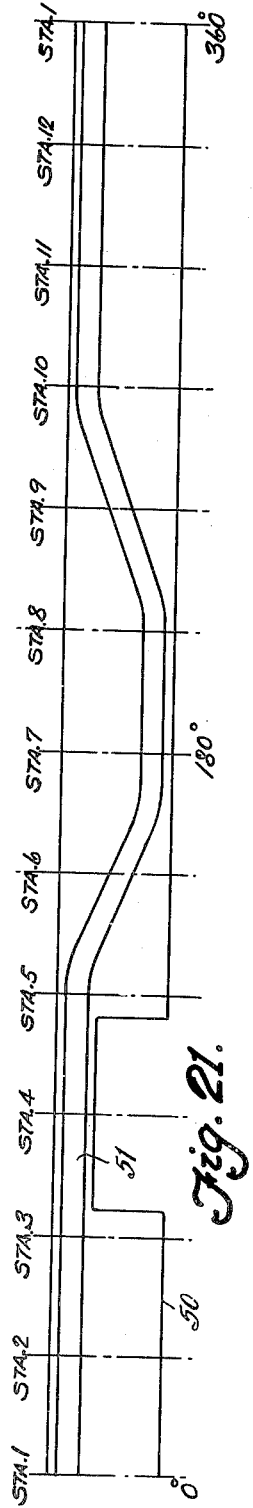
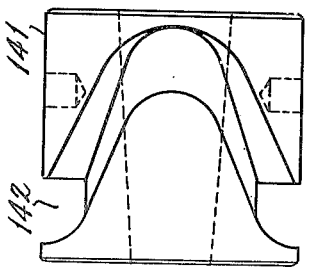
INVENTOR
Herbert C. Schryver
by Willits Hardman
and Fihr
his ATTORNEYS Patented July 20, 1954

2,683,924

UNITED STATES PATENT OFFICE 2,683,924

MACHINE FOR ASSEMBLING NIPPLES ON CABLES

Herbert C. Schryver, Warren, Ohio, assignor to General Motors Corporation, Detroit, Mich., a corporation of Delaware Application December 30, 1949, Serial No. 135,989

10 Claims. (Cl. 29—203)

This invention relates to the manufacture of insulated wires, for example, spark plug cables used on automobiles for connecting the ignition distributor with the spark plugs. For waterproofing the connection between a spark plug cable and a terminal of the distributor, it has been the practice to place a rubber nipple on the cable, the nipple having a part which closely fits the cable and a part adapted to enclose the tubular extension of the distributor which provides a socket for receiving the cable.

The object of the present invention is to provide a machine for assembling nipples on cables.

Further objects and advantages of the present invention will be apparent from the following description, reference being had to the accompanying drawings, wherein a preferred embodiment of the present invention is clearly shown.

In the drawings:

Figs. 1 to 5 are sectional views showing parts of the machine and how it operates to assemble the nipple with the cable.

Figs. 6 and 7 together comprise a sectional view on line 6—6 of Fig. 8.

Fig. 7A is a fragmentary view in the direction of arrow 7A and is partly in section on line 7A—7A of Fig. 7.

Fig. 9 is a sectional view on line 9—9 of Fig. 7.

Figs. 10 and 11 are fragmentary, sectional views on lines 10—10 and 11—11 respectively of Fig. 7.

Fig. 12 is a fragmentary, sectional view on line 12—12 of Fig. 6.

Fig. 13 is a view on line 13—13 of Fig. 7.

Figs. 14 and 15 are sectional views taken, respectively, on lines 14—14 and 15—15 of Fig. 13.

Figure 8:
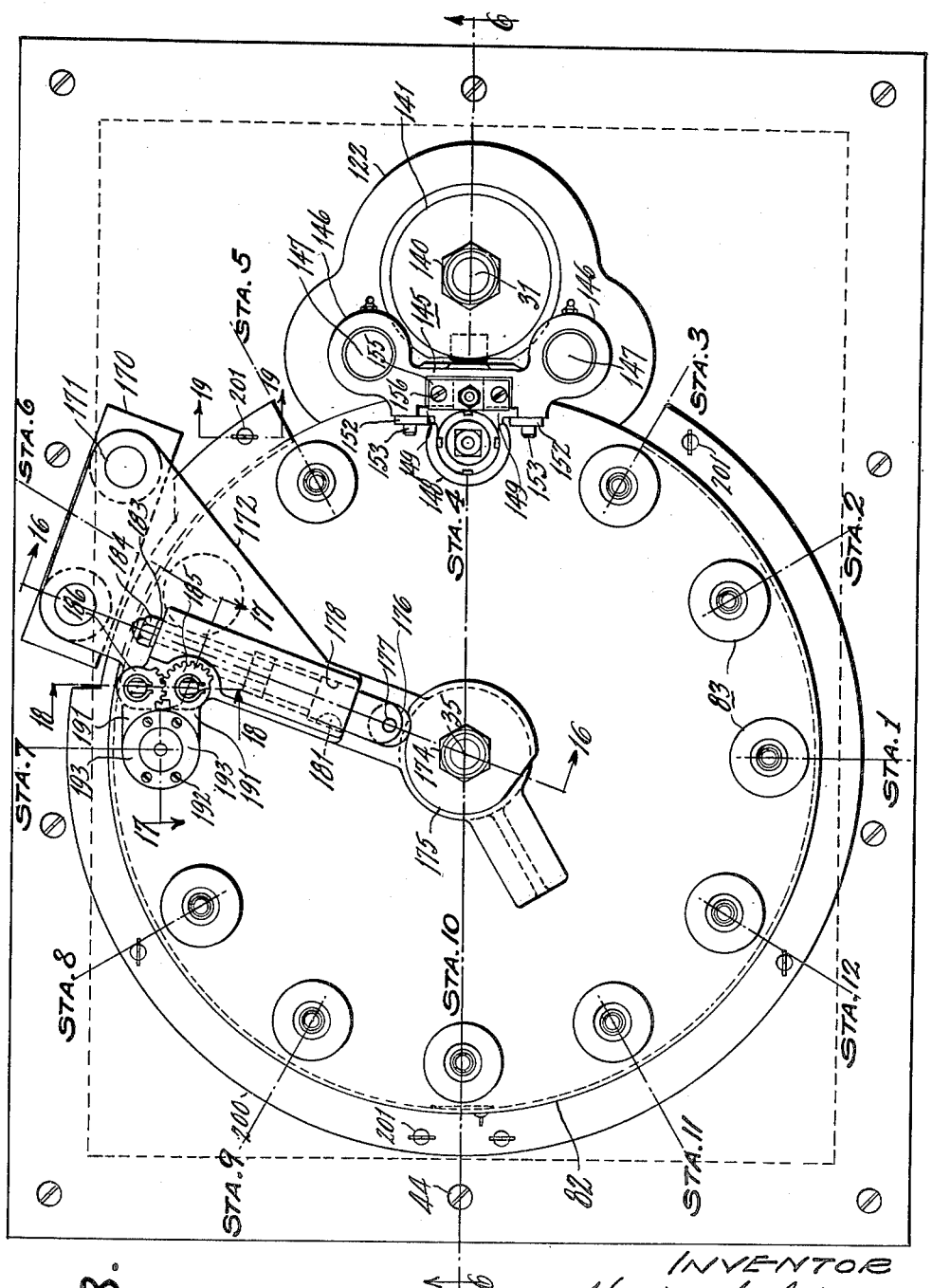
Fig. 8 is a plan view of the machine.
Figure 16:
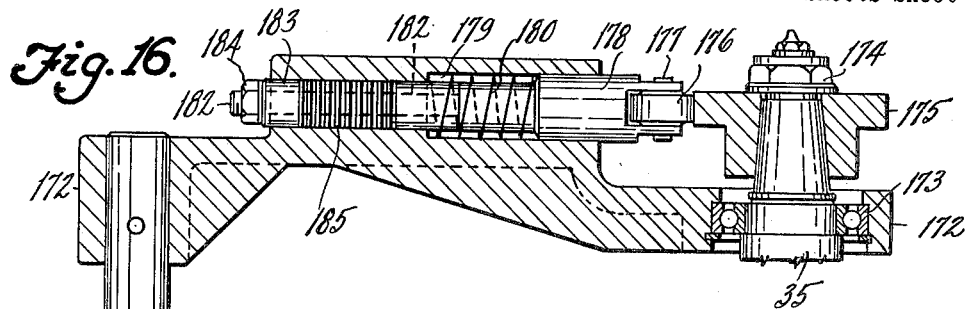
Figure 17:
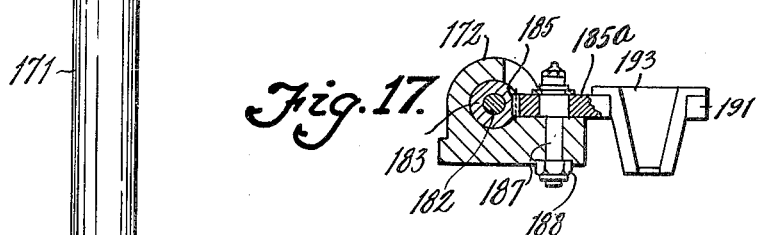
Figure 18:
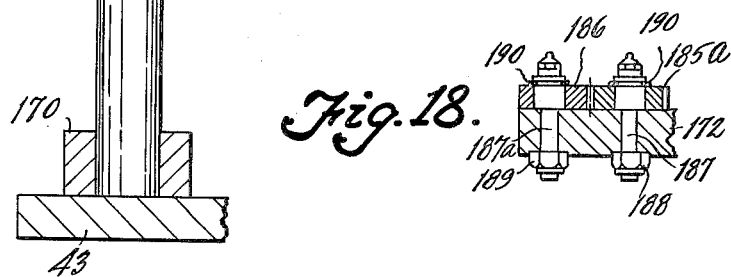

Figs. 16, 17, 18 and 19 are fragmentary, sectional views taken on the lines 16—16, 17—17, 18—18 and 19—19 of Fig. 8.

Figs. 20, 21 and 22 are development views of certain cams.

Fig. 23 is a view of the cam, of which Fig. 22 is a development.

Referring to Fig. 6, a coupling 30 connects a motor driven shaft, not shown, with a shaft 31 connected by a sprocket 32, chain 33, and sprocket 34 with a shaft 35 journaled in a bearing 36 provided by a tubular shaft 37.

Referring to Fig. 7, shaft 37 provides a bearing 38 for shaft 35. Shaft 37 is journaled in bearings 39 provided by a tubular post 40 attached to a flange 41 which screws 42 secure to a plate 43, which screws 44 (Figs. 7 and 8) secure to the upper angle members 45 of a box-like frame having bottom angle members, not shown, arranged like members 45 and connected by vertical angles 46, the upper ends of which appear in Fig. 7. This frame is enclosed by vertical side plates 47.

Post 40 supports a cam 50 having a race 51 and supporting a stud 52 which, as shown in Fig. 11, is located between screws 53 threaded through lugs 54 of the flange 41. By turning the screws the angular location of cam 50 relative to the post 40 can be adjusted. When this adjustment is made, lock nuts 55 are tightened to prevent rotation of screws 53 and a screw 56 (Fig. 7) is tightened to bind the cam 50 firmly to the post 40.

Post 40 supports a cam 60 having a race 61 and supporting a stud 62 threaded into a bushing 63 which is threaded into the cam 60. As shown in Fig. 10, the upper end of the stud 62 is located between screws 63 threaded through lugs 64 of a clamping plate 66 embracing the post 40 and clamped thereto by a screw 67 passing through a plain hole in bifurcation 68 and through a tapped hole in bifurcation 69. By turning screws 63, the angular location of cam 60 relative to post 40 can be adjusted. When this adjustment is made, lock nuts 65 are tightened to prevent turning the screws 63 and a screw 70 (Fig. 7) is tightened to firmly bind the cam 60 to the post 40. Bearing 38 is located between a shaft seal 71 supported by shaft 37 and a shaft seal 72 supported by a plate 73 which screws 74 attach shaft 37.

Shaft 37 is connected with a disc 80 which rests on bearing race 39a and to which screws 81 attach a circular plate or dial 82 which supports a plurality of workholders 83. As shown in Fig. 8, there are 12 workholders 83 equiangularly spaced. Each workholder 83 comprises a bushing 84 received by a hole in the plate 82 which is clamped between the flange 85 of the bushing and a washer 86 clamped by a nut 87 threadedly engaging that portion of the bushing which extends below the plate 82. To prevent rotation of bushing 84, a key 88 is received by grooves in the bushing 84 and dial 82. The bushing 84 guides for vertical movement a thin sleeve 90 which extends upwardly from a thicker tube 91 which is prevented from turning by a key 92 fitting in grooves provided by bushing 84 and the tube 91. A nut 93 threaded on the tube 91 secures thereto a bracket 94 carrying a screw 95 which pivotally supports a roller 96 received by the race 61 of the cam 60. Bracket 94 (Fig. 7A) has a bushing 94a which slides on a screw 94b secured to dial 82 by nuts 94c, which is parallel to tube 91 providing a guide for bracket 94 which is prevented from turning by screw 94c.

The integral members 90 and 91 support a quill 100 integral with a round bar 101 having a slot 102 for receiving a key 103 supported by tube 91 to prevent turning of the bar 101. Bar 101 supports a screw 104 providing a pivotal support for a roller 105 received by the race 51 of cam 50.

Dial 82 is indexed intermittently the angular distance of the spacing of the workholders 83 by a mechanism comprising a Geneva driven gear 110 (Fig. 6) which is secured to the lower end of the shaft 37 by a nut 111 and connected therewith by a key 112. Gear 110 (Fig. 12) has radial slots 113 each adapted to receive a roller 114 pivoted on a screw 115 attached by a nut 116 to Geneva gear driving arm 117 having a locking lug 118 which is adapted to be received by notches 119 of gear 110. Arm 117 is attached to a shaft 120 journaled in bearings 121 (Fig. 7) supported by a frame 122 which screws 123 attach to plate 43. Shaft 31, the lower end of which appears in Fig. 6, is journaled in bearings 124 (Fig. 7) supported by frame 122. Shaft 120 is retained by nuts 125 threaded on shaft 120 and enclosed by a cap 126 attached to frame 122. Shaft 31 extends through a shaft seal 127 retained by a cap 128 attached to frame 122. Shaft 120 has a flange 130 which retains a gear 131 connected with shaft 120 by a key 132. Nuts 133 threaded on shaft 31 retain a gear 134 meshing with gear 131 and connected with shaft 31 by a key 135. The motor driven shaft coupling 30 drives shaft 31 which drives shaft 120, which drives the Geneva gear. Therefore, during each rotation of shaft 31, the dial 82 is indexed counterclockwise in Fig. 8.

As the dial 82 moves intermittently, the rollers 96 and 105 are caused to move along the cam races 61 and 51 respectively of cams 60 and 50 respectively. The stations of the workholders are indicated in Fig. 8 by radial dot-dash lines marked respectively STA-1, etc. The positions of the followers 96 and 105 are correspondingly marked in Figs. 20 and 21 by vertical dot-dash lines marked with the station numbers.

A nut 140 (Fig. 7) threaded on the upper end of shaft 31 secures to the tapered portion of said shaft a cam 141 having a race 142 for receiving a roller 143 pivoted on a screw 144 attached to a frame 145 having integral sleeves 146 which slide on vertical rods 147 attached to frame 122 (Fig. 8). Frame 145 supports a bracket 148 which can be adjusted vertically relatively to the frame 145. The bracket 148 has mounting pads 149 each providing an oblique surface 150 received by a similar surface 151 of the frame 145. Plates 152, secured to frame 145 by screws 153, retain these surfaces in engagement and these surfaces can be wedged tightly together by turning a screw 154 engageable with a portion 148a (Fig. 7) of the bracket 148 and threaded through a plate 155 which screws 156 attach to plate 145. A sleeve 160 is threadedly received by bracket 148 and is secured in vertical adjusted position by nut 161. Sleeve 160 receives a screw 162 having a central recess 163. Between the lower end of screw 162 and a shoulder 165 of sleeve 160 there is located a disc 165 of flexible rubber-like material having normally a tapered opening 166. Below the disc 165, the sleeve 160 provides a socket 167 for receiving a nipple N (Fig. 2) made of flexible rubber-like compound, such as neoprene.

At station 1 (Fig. 8), the operator places a nipple N upon the workholder 83, as shown in Fig. 1. Neck portion n is supported above the quill 100 and the large socket portion s is received by the sleeve 90. While the workholder is at station 4, the sleeve 160 is caused to descend from the position shown in Fig. 1 to that shown in Fig. 2, thereby causing the socket portion s to be received by the tubular extension 84a of the bushing 84, thereby causing the nipple to be expanded so that its socket portion s is received by the tubular extension 84a of bushing 84 and so that the neck portion n is received by the sleeve 90. During descent of the sleeve 160, the disc 165 receives the quill 100 which is distorted as shown in Fig. 2, so as to practically fill the space between the bushing 160, the sleeve 90 and the screw 162, the disc 165 crowding the neck n of the nipple downwardly around the sleeve 90.

After the nipple N has been located as shown in Fig. 2, the sleeve 160 is retracted and the workholder is carried by the dial to station 7. Before arriving at station 7, the quill 100 is caused to descend. At station 7, the operator places the cable C with terminal clip T attached thereto within the sleeve 90 as shown in Fig. 3. The cable C is guided into this position by means to be described. As the workholder passes from station 7 to station 8, the sleeve 90 is caused to descend from the position shown in Fig. 3 to that shown in Fig. 4, thereby releasing the neck n of the nipple N so that the nipple N will contract around the cable C. As the workholder moves from station 8 to station 9, the quill moves part way up to cause the cable C to move upwardly carrying the nipple N with it since the friction between neck end n and cable C insulated with rubber-like compound is greater than the friction between the expanded portion s and the part 84a of bushing 84. Therefore the cable and the nipple are free of connection with parts of the machine and will fall upon the dial 82. As the workholder moves from station 9 to station 10, the sleeve 90 and the quill 100 return to the original position shown in Fig. 1.

The apparatus for guiding the cable into the position shown in Fig. 3 will now be described with reference to Figs. 8, 16, 17 and 18. A plate 170 attached to table 43 supports two rods 171 which support a bracket 172 providing a recess which receives a ball bearing 173 received by the shaft 35, thereby fixing the location of bracket 172, relative to the axis of shaft 35. A nut 174, threaded on the upper end of shaft 35, retains a cam 175 on the tapered portion of shaft 35. Cam 175 is engaged by roller 176 pivoted on a pin 177 carried by a rod 178 sliding in a socket 179 provided by a bracket 172 and urged to the right (Fig. 16) by a spring 180 so that the roller 176 follows the cam 175. A key 181 (Fig. 8) carried by rod 178 fits in a key groove provided by bracket 172 so that rotation of the rod 178 is prevented. Rod 178 has a reduced portion 182 which receives a sleeve 183 retained by a nut 184 threaded on the left end of said reduced portion 182. Sleeve 183 provides a rack 185 (Fig. 17) meshing with a gear segment 185a pivoted on a stud 187 retained on bracket 172 by nut 188. Gear segment 185a (Fig. 18) meshes with a gear segment 186 journaled on a stud 187a which a nut 189 retains on bracket 172. Split snap rings 190 received by grooves in studs 187 and 187a retain the gear segments 185a and 186. These segments are integral respectively with arms 191 to which screws 192 attach half funnel members 193 made preferably of aluminum. These members, when brought together, as shown in Fig. 8, form a complete funnel, the lower end of which will be slightly above the sleeves 90 when the workholder is at station 7. The cam 175 is timed relative to the gear driving arm 117 (Figs. 6 and 12) so that the funnel members 193 will be together while the dial 82 is at rest and so that the funnel members will separate just before the dial 82 starts moving. This funnel guides the cable C into the open sleeve 90 as shown in Fig. 3, thus making it easy for the operator to place the cable in the position shown during the time the dial 82 is at rest.

Figure 19:
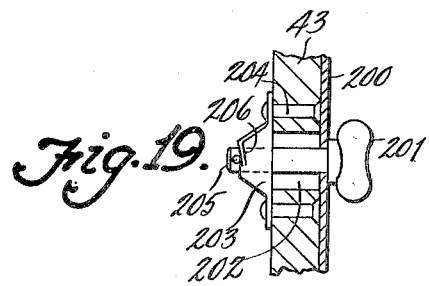

The side plate 47 (Fig. 7) and the guard 200 are retained by quick releasing fastening devices, such as shown in Fig. 19. Each device comprises a wing rod 201 which passes through the plate such as 200, and through a hole 202 and the fixed support, such as table 43, and through a fixture 203 which rivets 204 secure to plate 43. Rod 201 carries a cross pin 205 which, when the wing rod 201 is turned 90° from the position shown in Fig. 19, will pass through a hole having diametrically opposite notches in the fixture 203. When the rod is turned into the position shown in Fig. 19, the cross pin 205 is received by spring fingers, one of which is shown at 206.

From the foregoing description, it is apparent that the present machine provides a conveyor or dial 82 carrying a plurality of workholders 83, each comprising, in concentric relation, a fixed tubular part 84a, a thin-walled sleeve 90 slidable within the fixed tube 84a and a quill 100 slidable within the sleeve 90. The machine provides a device 160 for forcing a nipple N supported by the workholder in a direction to cause the socket portion of the nipple to become expanded and to embrace the tube 84a and the neck portion of the nipple to become expanded and to embrace the thin-walled sleeve 90. The machine provides means including cam 50 for retracting the quill 100 as the dial turns so that space is provided with the sleeve 90 to receive the cable C. The machine provides means including cam 60 for retracting the sleeve 90 from the nipple so that the neck portion of the nipple will contract about the cable. Cam 50 provides for movement of the quill 100 to force the nipple from the tubular portion 84a of the workholder so that the assembly of cable and nipple is ejected; and cams 60 and 50 provide for return of the sleeve 90 and quill 100 to original position.

While the embodiment of the present invention as herein disclosed, constitutes a preferred form, it is to be understood that other forms might be adopted.

What is claimed is as follows:

1. A machine for assembling nipples on electrical conductors having in combination, a conveyor having a plurality of workholders thereon, each of which includes an annular bushing projecting from the surface of the conveyor and within which is received a sleeve movable relatively thereto, a quill slidable within the sleeve and movable to a position beyond the sleeve to permit a nipple having a central aperture therethrough for receiving a conductor to be mounted on said quill, a positioning means operable to move the nipple relatively to the quill and sleeve and toward the conveyor sufficiently to position the nipple wholly on the sleeve and annular bushing, means for retracting the quill from the position occupied thereby when the nipple is mounted thereon while the sleeve remains relatively fixed so as to permit the conductor, on which the nipple is to be assembled, to be positioned within the sleeve on which the nipple is supported, means for withdrawing the sleeve from within the nipple after the conductor has been positioned within the sleeve to permit the nipple to engage the conductor, means for moving the quill to effect movement of the conductor with the nipple mounted thereon far enough away from the workholder to disengage the nipple from the annular bushing, said several means for performing the functions set forth being operative as the conveyor is moved to different positions, and means for moving the conveyor in properly timed relation to the time of operation of said several means.

2. A machine for assembling nipples on electrical conductors having in combination, a conveyor having a plurality of workholders thereon, each of which includes an annular bushing projecting from the surface of the conveyor and within which is received a sleeve movable relatively thereto, a quill slidable within the sleeve and movable to a position beyond the sleeve to permit a nipple having a central aperture therethrough for receiving a conductor to be mounted on said quill, a positioning means operable to move the nipple relatively to the quill and sleeve and toward the conveyor sufficiently to position the nipple wholly on the sleeve and annular bushing, means for retracting the quill from the position occupied thereby when the nipple is mounted thereon while the sleeve remains relatively fixed so as to permit the conductor, on which the nipple is to be assembled, to be positioned within the sleeve on which the nipple is supported, means for withdrawing the sleeve from within the nipple after the conductor has been positioned within the sleeve to permit the nipple to engage the conductor, means for moving the quill to effect movement of the conductor with the nipple mounted thereon far enough away from the workholder to disengage the nipple from the annular bushing, said several means for performing the functions set forth being operative as the conveyor is moved to different positions, means for moving the conveyor, a cam for controlling operation of said several means, a plurality of cam followers engaging said cam and operated thereby as the conveyor is moved to effect operation of certain of the aforementioned means.

3. A machine for assembling nipples on electrical conductors having in combination, a conveyor having a plurality of workholders thereon, each of which includes an annular bushing projecting from the surface of the conveyor and within which is received a sleeve movable relatively thereto, a quill slidable within the sleeve and movable to a position beyond the sleeve to permit a nipple having a central aperture therethrough for receiving a conductor to be mounted on said quill, a positioning means operable to move the nipple relatively to the quill and sleeve and toward the conveyor sufficiently to position the nipple wholly on the sleeve and annular bushing, means for retracting the quill from the position occupied thereby when the nipple is mounted thereon while the sleeve remains relatively fixed so as to permit the conductor, on which the nipple is to be assembled, to be positioned within the sleeve on which the nipple is supported, means for withdrawing the sleeve from within the nipple after the conductor has been positioned within the sleeve to permit the nipple to engage the conductor, means for moving the quill to effect movement of the conductor with the nipple mounted thereon far enough away from the workholder to disengage the nipple from the annular bushing, said several means for performing the functions set forth being operative as the conveyor is moved to different positions, means for moving the conveyor, a stationary cam for controlling operation of said several means, a plurality of cam followers supported on the conveyor, said followers engaging said cam and being operated thereby as the conveyor is moved to effect operation of certain of the aforementioned means during movement of the conveyor.

4. A machine for assembling nipples on electrical conductors having in combination, a conveyor having a plurality of workholders thereon each of which includes an annular bushing projecting from the surface of the conveyor and within which is received a sleeve movable relatively thereto, a quill slidable within the sleeve and movable to a position beyond the sleeve to permit a nipple having a central aperture therethrough for receiving a conductor to be mounted on said quill, a positioning means operable to move the nipple relatively to the quill and sleeve and toward the conveyor sufficiently to position the nipple wholly on the sleeve and annular bushing, means for retracting the quill from the position occupied thereby when the nipple is mounted therein while the sleeve remains relatively fixed so as to permit the conductor, on which the nipple is to be assembled, to be positioned within the sleeve on which the nipple is supported, means for withdrawing the sleeve from within the nipple after the conductor has been positioned within the sleeve to permit the nipple to engage the conductor, means for moving the quill to effect movement of the conductor with the nipple mounted thereon far enough away from the workholder to disengage the nipple from the annular bushing, means for moving the conveyor and mechanism for operating the actuating means for the quill and the sleeve during movements of the conveyor.

5. A machine for assembling nipples on electrical conductors having in combination, a conveyor having a plurality of workholders thereon, each of which includes an annular bushing projecting from the surface of the conveyor and within which is received a sleeve movable relatively thereto, a quill slidable within the sleeve and movable to a position beyond the sleeve to permit a nipple having a central aperture therethrough for receiving a conductor to be mounted on said quill, a positioning means operable to move the nipple relatively to the quill and sleeve and toward the conveyor sufficiently to position the nipple wholly on the sleeve and annular bushing, means for retracting the quill from the position occupied thereby when the nipple is mounted thereon while the sleeve remains relatively fixed so as to permit the conductor, on which the nipple is to be assembled, to be positioned within the sleeve on which the nipple is supported, means for withdrawing the sleeve from within the nipple after the conductor has been positioned within the sleeve to permit the nipple to engage the conductor, means for moving the quill to effect movement of the conductor with the nipple mounted thereon far enough away from the workholder to disengage the nipple from the annular bushing, means for moving the conveyor, mechanism for operating the actuating means for the quill and the sleeve during movements of the conveyor and means for operating the means for positioning the nipple on the bushing while the conveyor is stationary.

6. A machine for assembling nipples on electrical conductors having in combination, a conveyor having a plurality of workholders thereon, each of which includes an annular bushing projecting from the surface of the conveyor and within which is received a sleeve movable relatively thereto, a quill slidable within the sleeve and movable to a position beyond the sleeve to permit a nipple having a central aperture therethrough for receiving a conductor to be mounted on said quill, a positioning means operable to move the nipple relatively to the quill and sleeve and toward the conveyor sufficiently to position the nipple wholly on the sleeve and annular bushing, means for retracting the quill from the position occupied thereby when the nipple is mounted thereon while the sleeve remains relatively fixed so as to permit the conductor, on which the nipple is to be assembled, to be positioned within the sleeve on which the nipple is supported, means for withdrawing the sleeve from within the nipple after the conductor has been positioned within the sleeve to permit the nipple to engage the conductor, means for moving the quill to effect movement of the conductor with the nipple mounted thereon far enough away from the workholder to disengage the nipple from the annular bushing, guiding means for guiding the conductor as the latter is moved into the sleeve with the nipple positioned thereon and comprising separable parts movable toward each other to form a passage in alignment with the sleeve through which the conductor is movable into said sleeve, means for moving the conveyor, mechanism for effecting operation of the actuating means for the quill and sleeve during movement of the conveyor, and means for effecting separation of the guiding means and for operating the means for positioning the nipple on the sleeve while the conveyor is stationary.

7. A machine for assembling nipples on electrical conductors having in combination, a conveyor having a plurality of workholders thereon, each of which includes an annular bushing projecting from the surface of the conveyor and within which is received a sleeve movable relatively thereto, a quill slidable within the sleeve and movable to a position beyond the sleeve to permit a nipple having a central aperture therethrough for receiving a conductor to be mounted on said quill, a positioning means operable to move the nipple relatively to the quill and sleeve and toward the conveyor sufficiently to position the nipple wholly on the sleeve and annular bushing, means for retracting the quill from the position occupied thereby when the nipple is mounted thereon while the sleeve remains relatively fixed so as to permit the conductor, on which the nipple is to be assembled, to be positioned within the sleeve on which the nipple is supported, means for withdrawing the sleeve from within the nipple after the conductor has been positioned within the sleeve to permit the nipple to engage the conductor, means for moving the quill to effect movement of the conductor with the nipple mounted thereon far enough away from the workholder to disengage the nipple from the annular bushing, means for moving the conveyor, a cam cooperating with elements carried by the conveyor for effecting operation of the actuating means for said quill and sleeve during movement of the conveyor, a second cam for operating said positioning means and means for actuating said second cam while the conveyor is stationary, so that the positioning means is operated to force the nipple into position on the sleeve and bushing when the conveyor is not in motion.

8. A machine for assembling nipples on electrical conductors having in combination, a conveyor having a plurality of workholders thereon, each of which includes an annular bushing projecting from the surface of the conveyor and within which is received a sleeve movable relatively thereto, a quill slidable within the sleeve and movable to a position beyond the sleeve to permit a nipple having a central aperture therethrough for receiving a conductor to be mounted on said quill, a positioning means operable to move the nipple relatively to the quill and sleeve and toward the conveyor sufficiently to position the nipple wholly on the sleeve and annular bushing, means for retracting the quill from the position occupied thereby when the nipple is mounted thereon while the sleeve remains relatively fixed so as to permit the conductor, on which the nipple is to be assembled, to be positioned within the sleeve on which the nipple is supported, means for withdrawing the sleeve from within the nipple after the conductor has been positioned within the sleeve to permit the nipple to engage the conductor, means for moving the quill to effect movement of the conductor with the nipple mounted thereon far enough away from the workholder to disengage the nipple from the annular bushing, means for intermittently moving the conveyor, guiding means for guiding the conductor as it is moved into the sleeve and including parts movable away from each other to permit removal of the conductor from its guiding means, a cam and means operated thereby for effecting operation at the actuating means for said quill and sleeve during movement of the conveyor, a second cam for effecting operation of the means for positioning the nipple on the sleeve and bushing, a third cam for effecting separation of the parts of the guiding means, and means operable by the second and third cams for actuating the nipple positioning means and the guide separating means while the conveyor is stationary.

9. A machine for assembling nipples on electrical conductors having in combination, a conveyor having a plurality of workholders thereon, each of which includes an annular bushing projecting from the surface of the conveyor and within which is received a sleeve movable relatively thereto, a quill slidable within the sleeve and movable to a position beyond the sleeve to permit a nipple having a central aperture therethrough for receiving a conductor to be mounted on said quill, a positioning means operable to move the nipple relatively to the quill and sleeve and toward the conveyor sufficiently to position the nipple wholly on the sleeve and annular bushing, means for retracting the quill from the position occupied thereby when the nipple is mounted thereon while the sleeve remains relatively fixed so as to permit the conductor, on which the nipple is to be assembled, to be positioned within the sleeve on which the nipple is supported, means for withdrawing the sleeve from within the nipple after the conductor has been positioned within the sleeve to permit the nipple to engage the conductor, means for moving the quill to effect movement of the conductor with the nipple mounted thereon far enough away from the workholder to disengage the nipple from the annular bushing, means for intermittently moving the conveyor, guiding means for guiding the conductor as it is moved into the sleeve and including parts movable away from each other to permit removal of the connector from its guiding means, a cam and means operated thereby for effecting operation of the actuating means for said quill and sleeve during movement of the conveyor, a second cam for effecting operation of the means for positioning the nipple on the sleeve and bushing, a third cam for effecting separation of the parts of the guiding means, means operable by the second and third cams for actuating the nipple positioning means and the guide separating means while the conveyor is stationary, and means for continuously moving the second and third cams during the intermittent movement of the conveyor and a single driving means for operating the conveyor and said second and third cams.

10. A machine for assembling nipples on electrical conductors having in combination, a conveyor having a plurality of workholders thereon, each of which includes an annular bushing projecting from the surface of the conveyor and within which is received a sleeve movable relatively thereto, a quill slidable within the sleeve and movable to a position beyond the sleeve to permit a nipple having a central aperature therethrough for receiving a conductor to be mounted on said quill, a positioning means operable to move the nipple relatively to the quill and sleeve and toward the conveyor sufficiently to position the nipple wholly on the sleeve and annular bushing, a guiding means for guiding the conductor into the nipple which is to be assembled on said conductor, means for moving the conveyor and the nipple successively into alignment with the positioning means and the guiding means and to move said nipple beyond the guiding means, means for operating said quill and effective to retract the quill during movement of the nipple from alignment with the positioning means into alignment with the guiding means so that the guided conductor can be moved into the nipple, means operative during movement of the nipple beyond said guiding means to withdraw the sleeve from said nipple to permit the latter to engage the conductor and means to cause the quill operating means to move the quill so as to effect movement of the conductor with the nipple mounted thereon far enough away from the conveyor to withdraw the nipple from the bushing as the nipple is moved by the conveyor beyond the guiding means.

References Cited in the file of this patent

UNITED STATES PATENTS

| Number | Name | Date |
|---|---|---|
| 1,455,953 | Wright | May 22, 1923 |
| 1,712,670 | Madden | May 14, 1929 |
| 1,830,446 | Schunemann | Nov. 3, 1931 |
| 2,294,042 | Minor | Aug. 25, 1942 |
| 2,303,689 | Graham | Dec. 1, 1942 |
| 2,408,882 | Robbins | Oct. 8, 1946 |
| 2,497,921 | Ballard | Feb. 21, 1950 |